United States Patent [19]

Hendy

[11] 4,234,664
[45] Nov. 18, 1980

[54] ORIENTED POLYOLEFIN FILM

[75] Inventor: Brian N. Hendy, Welwyn, England

[73] Assignee: Imperial Chemical Industries Limited, London, England

[21] Appl. No.: 25,599

[22] Filed: Mar. 30, 1979

Related U.S. Application Data

[63] Continuation of Ser. No. 762,157, Jan. 24, 1977.

[30] Foreign Application Priority Data

Feb. 6, 1976 [GB] United Kingdom ............... 4767/76

[51] Int. Cl.$^3$ .............................................. B32B 27/32
[52] U.S. Cl. ...................................... 428/520; 252/8.8;
    252/8.75; 428/910; 428/516
[58] Field of Search ............... 428/910, 516; 252/88,
    252/8.75

[56] References Cited

U.S. PATENT DOCUMENTS

| 2,832,697 | 4/1958 | Walles | 428/516 |
| 2,891,878 | 6/1959 | Chamberlain | 252/8.75 |
| 2,897,170 | 7/1959 | Gruber | 428/375 X |
| 3,914,496 | 10/1975 | Jorek | 252/8.7 |
| 4,117,193 | 9/1978 | Tsuchiya et al. | 428/516 X |

FOREIGN PATENT DOCUMENTS 1403582  8/1975  United Kingdom .

Primary Examiner—Marion McCamish
Assistant Examiner—E. Rollins Buffalow
Attorney, Agent, or Firm—Cushman, Darby & Cushman

[57] ABSTRACT

Oriented polyolefin (especially polypropylene) film having antistatic properties is produced by applying to the cast extrudate an aqueous solution of an 'Ethoquad' salt (e.g. 'Ethoquad' C/12) before heating and stretching the extrudate to orient it. The corresponding tertiary amine chlorides (e.g. prepared from 'Ethomeen' T/12) are not effective.

8 Claims, No Drawings

ORIENTED POLYOLEFIN FILM

This is a continuation, of application Ser. No. 762,157 filed Jan. 24, 1977 now defensive publication T961008 published Apr. 5, 1977.

This invention relates to oriented polyolefin film, and, in particular, to antistatic, oriented polyolefin film.

By an "antistatic film" is meant a treated film exhibiting a reduced tendency, relative to an untreated film, to accumulate static electricity on a surface thereof.

Oriented polyolefin film is made by extruding polymer in the form of a sheet or tube ("cast extrudate") which is then heated and stretched to produce oriented film. A tubular extrudate may be heated and stretched as a tube by the bubble process, and a flat extrudate may be stretched using a stenter. It is possible to provide the oriented film with antistatic properties by incorporating certain antistatic agents into the polymer from which the film is made, but it is more effective in some instances if the antistatic agent is applied to the surface of the film.

Accordingly, the present invention provides an oriented polyolefin film having on at least one surface thereof a quaternary ammonium salt of general formula:

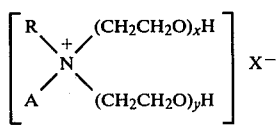

in which X is a univalent anion or an equivalent of a multivalent anion, x and y are positive integers the sum of which is from 2 to 5, A is a lower alkyl group, and R is a univalent aliphatic radical having from 1 to 22 carbon atoms.

The invention further provides a method of producing an antistatic, oriented polyolefin film by extruding a polyolefin to form a cast extrudate, applying to the cast extrudate a solution of one or more quaternary ammonium salts having the general formula:

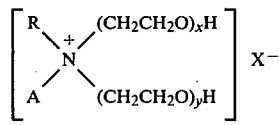

in which X is a univalent anion or an equivalent of a multivalent anion, x and y are positive integers the sum of which is from 2 to 5, A is a lower alkyl group, and R is a univalent aliphatic radical having from 1 to 22 carbon atoms, and thereafter heating and stretching the extrudate to orient it.

Any film-forming polyolefin, such as homo- and copolymers of ethylene, propylene, butene-1, and 4-methylpentene-1, may be employed in the process of the present invention, a preferred material being a high molecular weight stereoregular predominantly crystalline polymer of propylene, either in the form of a homopolymer or copolymerized with minor quantities (e.g. up to 15% by weight of the copolymer) of other unsaturated monomers, such as ethylene. The cast extrudate may be made by coextrusion of two or more polymers, one of which is for example a propylene homopolymer and the other may be for example a copolymer of propylene (80–95% by weight) with another alpha-olefin containing 4–10 carbon atoms, such as but-1-ene, as described in British Pat. No. 1 452 424.

It is important that the quanternary ammonium salt is used in the present invention; use of the corresponding tertiary amine as the hydrochloride salt does not provide the oriented film with satisfactory antistatic properties. In the general formula above, it is convenient to use quaternary ammonium salts (e.g. chlorides) in which the sum of x and y is 2, A is methyl, and R is a mixture of aliphatic hydrocarbon radicals having 8–18, preferably 12–18, carbon atoms, particularly those which are derived from tallow or soya oil and are predominantly composed of hexadecyl, octadecyl and octadec-9-enyl (oleyl) radicals or derived from coconut oil and predominantly composed of dodecyl (e.g. >50 wt %) with a minor proportion of tetradecyl (e.g. up to 20 wt %) radicals. Examples of suitable quaternary ammonium chlorides are sold as 'Ethoquad' C/12 and 'Ethoquad' O/12 (Armour Hess Chemicals Limited) or may be formed by the addition of methyl chloride to the tertiary amines sold as 'Ethomeen' T/12 and 'Ethomeen' S/12 (Armour Hess Chemicals Limited).

The amount of quaternary ammonium salt present in the applied solution depends, inter alia, on the level of antistatic properties required in the treated film, and suitably is such that the treated film exhibits a surface resistivity not exceeding 10, and preferably less than 0.5, gigohms. Conveniently, the amount of quaternary ammonium salt present on the surface of the treated film constitutes from 0.05 to 2.5, preferably 0.1 to 1%, by weight of the film.

Although films having satisfactory antistatic properties are achieved by use of the aforementioned quaternary ammonium salts, the latter may, if desired, be supplemented by the presence of one or more additional antistatic agents in the treating solution. In particular, the quaternary ammonium salt, as hereinbefore defined, is suitably supplemented by a monoethoxylated quaternary ammonium salt—such as choline chloride.

The films of this invention may be uniaxially oriented, but are preferably biaxially oriented by drawing in two mutually perpendicular directions in the plane of the film to impart strength thereto. Orientation of flat film may be effected by a stenter technique, while oriented tubular film is suitably produced by melt extruding the polymeric material in the form of a tube from an annular die, cooling the extruded tube, reheating and inflating the tube by the so-called "bubble" process to introduce transverse orientation, and simultaneously elongating the tube longitudinally to orient the film in a lengthwise direction. The film is then preferably "heat-set," i.e. dimensional stability of the film is improved by heating the film, while restrained against thermal shrinkage, to a temperature above the glass transition temperature of the polymer from which the film is formed but below the melting point thereof.

While the solution of the quaternary ammonium salt may be applied between the orienting steps of a sequential drawing procedure, we prefer to apply the solution to the cast, unoriented extrudate immediately prior to the reheating and orienting stage of the film-forming process. Evaporation of the solvent vehicle is therefore effected during the reheating operation, and the quaternary salt becomes firmly bound to the film surface during orientation.

The quaternary ammonium salt may be applied to the film surface in any suitable solvent vehicle, but for economy and ease of application we prefer to employ a solution of the salt in an aqueous vehicle.

The films of the present invention may conveniently contain any of the agents conventionally employed in the manufacture of polyolefin films—such as pigments, lubricants, stiffening aids, anti-oxidants, and surface-active agents.

Films according to the present invention may vary in thickness depending on the intended application, but usually we find that films having a thickness of from 2 to 150 microns are of general utility. Films intended for use in packaging operations are suitably within a thickness range from 10 to 50 microns.

Films according to the invention may be subjected to conventional after-treatments—for example, a corona discharge treatment to improve the bonding and print-receptive properties of the film surface.

The following examples illustrate the invention.

EXAMPLES 1 TO 4

In order to simulate the behaviour of a cast polyolefin extrudate coated with an aqueous solution of one or more quaternary ammonium chlorides according to the present invention and then heated and stretched to produce oriented film, samples of preformed film were coated and submitted to heat ageing at 130° C. and their antistatic properties were measured.

Oriented polypropylene film melt-coated with a propylene/butene copolymer, produced as described in Example 2 of British Pat. No. 1 452 424, was used. Samples of the film were stretched taut using a ring clamp and coated with an aqueous solution of 1% by weight of 'Ethoquad' C/12 (Example 1) or 'Ethoquad' O/12 (Example 2). The solution was placed in drops on the surface of the film and spread uniformly and very thinly by means of a Meier bar (pre-wetted with the solution) as applicator. The Meir bar was moved back and forth twice to leave a coherent liquid layer over the area of film. The coated film was dried in an oven at 105° C. for 5 minutes and then (to simulate the conditions of orientation of cast tube) it was heat-aged at 130° C. for various times up to 105 minutes in an air oven with fan, all the while held taut in the ring clamp.

After equilibration of the film sample overnight, the surface resistivity of the coated area was measured in a simple apparatus in which the film was gripped between two large metal spring clips ("Bulldog" clips) each 73 mm long and spaced 6 mm apart. This 6 mm length of film (which was about 60 mm wide) between the clips completed a circuit made up of a stabilized DC power supply (0–30 V) in series with a "Servoscribe" potentiometric recorder (having 50 divisions for full-scale deflexion). The voltage from the power supply found to be required to cause a certain deflexion of the recorder (expressed as volts per division) provided an arbitrary measure of the resistance of the circuit, of which the film sample was the only significant component. Comparative measurements were performed with samples of film coated in like manner but with the hydrochloride salt of 'Ethomeen' C/12 (corresponding chemically to 'Ethoquad' C/12) (Example 3) or of 'Ethomeen' T/12 (Example 4). The results were as follows.

| Time of heat-ageing- (minutes) | Resistance of film sample (volts/division) | | | |
|---|---|---|---|---|
| | 'Ethoquad' C/12 | 'Ethoquad' O/12 | 'Ethomeen' C/12 HCl | 'Ethomeen' T/12 HCl |
| 0 | 0.2 | 0.1 | 0.2 | 0.5 |
| 5 | 0.2 | 0.3 | 0.2 | 1.0 |
| 10 | 0.2 | 0.4 | 0.3 | 1.6 |
| 15 | 0.2 | — | 2.7 | 10 |
| 20 | 0.2 | 0.4 | 15 | >60 |
| 30 | 0.2 | — | >60 | — |
| 35 | — | 0.3 | — | — |
| 40 | — | — | — | — |
| 45 | 0.3 | — | — | — |
| 50 | — | 0.7 | — | — |
| 75 | 0.5 | 0.7 | — | — |
| 105 | 0.6 | 0.6 | — | — |

These results indicate that an aqueous solution of 'Ethoquad' C/12 or 'Ethoquad' O/12 may be applied to a cast extrudate which is thereafter heated and stretched to produce oriented polypropylene film having antistatic properties. For example, using the procedure described generally in British patent specification 1 284 321, a cast tube of polypropylene of diameter 159 mm and about 1 mm thick is extruded downwards at the rate of 102 mm/s and passed into an oven where it is heated and inflated as a bubble giving a 7-fold draw in each direction, and finally heat-set as described in British patent specification 1 124 886 to produce film 20 μm thick. Just above the oven, the aqueous solution of 'Ethoquad' C/12 or 'Ethoquad' O/12 containing about 14% by weight can be applied to the surface of the cast tube by means of an aluminium tray shaped to fit round the cast tube and lined with lint. The solution can be introduced into the tray by means of a peristaltic pump to give an average dry coat thickness on the oriented film of about 0.02 μm, the weight of quaternary ammonium salt in the coating amounting to about 0.1% of the weight of the film.

Film made in this way from 'Ethoquad' C/12 can have a surface resistivity of about 3 gigohms per sample of film (square of 127 mm side), whereas film produced in the same fashion but with a coating of 'Ethomeen' T/12 has a surface resistivity of 750 gigohms (average of duplicate measurements on each of five samples).

I claim:

1. An oriented polyolefin film comprising a polyolefin substrate having on at least one surface thereof a mixture comprising:

(a) a quaternary ammonium salt of the formula:

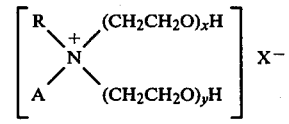

wherein X is a univalent anion or an equivalent of a multivalent anion, x and y are positive integers the sum of which is from 2 to 5, A is a lower alkyl group containing from 1 to 6 carbon atoms, and R is a univalent aliphatic radical containing from 1 to 22 carbon atoms, and (b) a monoethoxylated quaternary ammonium salt.

2. A film according to claim 1 wherein the quaternary ammonium salts (a) and (b) are present on the surface in an amount sufficient to yield a surface resistivity not exceeding 10 gigohms at 50% relative humidity.

3. A film according to claim 1 wherein R in the formula of the quaternary ammonium salt is a coconut oil residue and is predominantly composed of dodecyl radicals.

4. A film according to claim 1 wherein R in the formula of the quaternary ammonium salt is derived from oleine and is predominantly composed of oleyl radicals.

5. A film according to claim 1 wherein X is chlorine, the sum of x and y is 2, and A is a methyl group.

6. A film according to claim 1 wherein the salt of (b) is choline chloride.

7. A film according to claim 1 wherein the substrate comprises a substantially crystalline polymer of propylene.

8. A film according to claim 1 wherein the substrate is a multiple-layer substrate having a propylene layer and at least one surface layer of a copolymer of propylene with from 5 to 20% by weight of the copolymer of another alpha-olefin containing from 4 to 10 carbon atoms in its molecule.

* * * * *